United States Patent Office 3,825,581
Patented July 23, 1974

3,825,581
PRODUCTION OF MONOCHLOROACETONITRILE
Walter A. Gay and David F. Gavin, Cheshire, Conn.,
assignors to Olin Corporation
No Drawing. Filed Feb. 12, 1973, Ser. No. 332,045
Int. Cl. C07c 121/02
U.S. Cl. 260—465.7   9 Claims

ABSTRACT OF THE DISCLOSURE

A process is provided for producing monochloroacetonitrile by liquid phase chlorination of acetonitrile. Acetonitrile is chlorinated at a temperature in the range of 30–50° C. in a reaction mixture containing at least 18% by weight trichloroacetonitrile, the latter being formed in situ or added as an ingredient in a starting reaction mixture. Following chlorination, the reaction mixture is neutralized at a temperature of not more than 70° C. Monochloroacetonitrile is then separated from the reaction mixture by distillation or other suitable means.

BACKGROUND OF THE INVENTION

(1) Field of Invention

This invention relates generally to a method for producing monochlorinated aliphatic nitriles. Specifically the invention relates to a method for producing monochloroacetonitrile by liquid phase chlorination of acetonitrile.

Monochloroacetonitrile is known to be useful as an insecticide for various species of insects, particularly for grain infesting insects. It may also be used as a household fumigant due to its low toxicity to higher animals and lachrimatory properties which provide a built-in warning of its presence. The literature also reports its use as an intermediate in the manufacture of various pharmaceuticals and agricultural chemicals and in the manufacture of trichloroacetonitrile.

(2) Description of the Prior Art

Monochloroacetonitrile has heretofore been prepared by a variety of methods. The principal early method was to dehydrate monochloroacetamide with phosphorus pentoxide as reported by Steinkopf, Ber., 41, 2540 (1908) and Organic Synthesis, 30, 22 (1950). Phosphorus oxychloride has also been used to dehydrate monochloroacetamide as shown in French Pat. 1,365,202. The principal disadvantage of dehydrating monochloroacetamide is that of cost. Since monochloroacetamide is not readily available commercially, the process is generally a multi-step process involving chlorination of acetic acid, esterification, amidation, then dehydration of the amide to the nitrile. This involves additional equipment, additional chemicals and additional steps in the synthesis of the ultimate product.

Later monochloroacetonitrile was prepared by vapor phase chlorination of acetonitrile as shown in U.S. Pats. 2,283,237 and 3,121,735. While such processes produce a satisfactory end product, utilize a single step and readily available starting materials, equipment costs and heat requirements are high, making production costs substantially greater than those for a liquid phase chlorination system.

Other known methods of synthesis include reaction of aminoacetonitrile and hydrochloric acid as shown in U.S. Pat. 2,442,542, reaction of glycolonitrile in the presence of an organic base with thionyl chloride and $PCl_3$, $PCl_5$, or $POCl_3$ as shown in U.S. Pat. 2,331,681, reaction of glycinonitrile hydrochloride with nitrosyl chloride as shown in U.S. Pat. 2,331,682, and reaction of sodium cyanide, formamide and chloromethyliodide as shown in Japanese Pat. 12,417/1961.

It was heretofore believed impossible to obtain monochloroacetonitrile by liquid phase chlorination of acetonitrile. See, for example, statements to this effect in U.S. Pat. 2,283,237 and in Stepanov, F. N. and Shirokova, N. I., "Chlorination of Saturated Nitriles," J. Gen. Chem. U.S.S.R., 25, 905–956 (1955). This belief was based on the knowledge that in the chlorination of acetonitrile the monochlorinated derivative was formed quite slowly when compared to the relatively fast rate of chlorination of the monochlorinated derivative to form dichlorinated and trichlorinated derivatives. Thus, previous attempts to form monochloroacetonitrile by liquid phase chlorination produced only trichloroacetonitrile.

It is, therefore, the object of this invention to provide an economical method for producing monochloroacetonitrile by liquid phase chlorination of acetonitrile and to thereby obviate the indicated disadvantages of other methods.

SUMMARY OF THE INVENTION

The present invention is directed to the synthesis of monochloroacetonitrile. More particularly the invention provides a novel process for producing monochloroacetonitrile from acetonitrile by chlorination of acetonitrile in the liquid phase.

It has been discovered, contrary to all previous experience in the art, that the monochlorinated derivative of acetonitrile can be formed in the liquid phase and separated therefrom inexpensively and in commercially satisfactory yields by controlling the temperature of the reaction during chlorination and neutralization, and by neutralizing the reaction mixture after chlorination and prior to processing of the mixture to recover monochloroacetonitrile therefrom.

In general, the invention involves liquid phase chlorination of acetonitrile in the presence of a catalytic amount of a chloroination initiator and comprises chlorinating acetonitrile at a temperature of 30–50° C. in a reaction mixture containing at least 18% by weight trichloroacetonitrile, the latter being produced in situ or provided as an ingredient in the starting reaction mixture, neutralizing the reaction mixture at a temperature below about 70° C. utilizing a suitable base, drying the neutralized mixture if desired to remove water formed from the neutralization of the reaction mixture and separating monochloroacetonitrile by distillation or other known means.

The critical features of the process are the control of temperature during chlorination and neutralization, trichloroacetonitrile concentration reached or provided in the reaction mixture and the step of neutralizing the reaction mixture at a temperature below about 70° C. upon discontinuing chlorination.

DETAILED DESCRIPTION OF THE INVENTION

In accordance with the present invention, acetonitrile or a starting reaction mixture of acetonitrile and trichloroacetonitrile is pretreated with at least a trace of an initiator whose purpose is to activate the α-carbon of acetonitrile to render it receptive to liquid phase chlorination. It is known in the art that acids capable of donating a proton or accepting an electron pair activate the α-carbon of the acetonitrile molecule. Advantageously, Lewis acids will accept an electron pair from the molecule and thereby activate the α-carbon. Bronsted acids will donate a proton thereto and thereby activate the α-carbon of the molecule. Thus, Lewis acids selected from the group consisting of aluminum chloride, zinc chloride and boron trifluoride, or Bronsted acids selected from the group consisting of hydrogen chloride, sulfuric acid, nitric acid, and acetic acid may be used as the initiator. In the preferred embodiment anhydrous HCl is used as the initiator.

The amount of initiator used to pretreat the acetonitrile or mixture of acetonitrile and trichloroacetonitrile as the case may be, may vary from a trace to an amount sufficient to saturate the reaction medium. In the preferred embodiments, we have substantially saturated the reaction medium with anhydrous HCl prior to chlorination.

In theory one molecule of initiator should activate one molecule of acetonitrile. When that activated molecule is chlorinated, additional molecules of HCl are produced in the reaction mixture, in turn activating additional acetonitrile molecules. Thus after initially activating acetonitrile, the reaction becomes autocatalytic and eventually forms excess HCl which is bubbled off as a gas. Although the reaction is self-catalyzing after activation, the induction time i.e., the elapsed time which it takes the reaction to reach maximum speed, is quite prolonged when extremely small quantities of initiator are used. Accordingly, it is desirable to use more than a trace of initiator to circumvent a prolonged induction period.

If the reaction medium comprises only acetonitrile treated with an appropriate initiator, chlorination will produce a mixture of monochloroacetonitrile, dichloroacetonitrile and trichloroacetonitrile, the proportions thereof depending on temperature and depth of chlorination. At about 70° C. only trichloroacetonitrile is found in the reaction mixture regardless of depth of chlorination. At temperatures of 30-50° C., however, monochloroacetonitrile and trichloroacetonitrile are both present in the reaction mixture, the amounts thereof being dependent on the depth of chlorination.

At this temperature chlorination initially favors formation of trichloroacetonitrile. As the depth of chlorination increases, trichloroacetonitrile reaches a maximum concentration in the reaction mixture. It has been discovered that as trichloroacetonitrile approaches this maximum concentration, its rate of formation slows and the rate of formation of monochloroacetonitrile becomes relatively greater, thus causing a build-up of monochloroacetonitrile in the reaction mixture. We have thus found it advantageous to conduct chlorination at a temperature of from 30° C. to 50° C. At temperatures below 30° C. chlorination proceeds so slowly that the reaction is not economically feasible. At temperatures above 50° C. the yields of monochloroacetonitrile are substantially reduced due to the favorability of formation of trichloroacetonitrile.

We have found at this temperature that substantial amounts of monochloroacetonitrile begin to accumulate in the reaction mixture when the concentration of trichloroacetonitrile therein reaches about 18% by weight of the reaction mixture. As chlorination continues thereafter, additional trichloroacetonitrile is being formed but relatively larger amounts of monochloroacetonitrile are being formed. Upon prolonged chlorination the mole fraction of trichloroacetonitrile in the reaction mixture levels off (and may actually drop due to residue formation) and the mole fraction of monochloroacetonitrile in the reaction mixture continues to increase. It is not known how long the mole fraction of monochloroacetonitrile in the reaction mixture will continue to increase under continued chlorination. It has been determined, however, in the system utilizing only acetonitrile and initiator, that commercially satisfactory yields are obtained by chlorinating until about 30-35% of starting acetonitrile has been converted. This corresponds to a trichloroacetonitrile concentration in the reaction mixture of about 18 to 22%.

In accordance with the principles set forth above, it is apparent that the proportions of acetonitrile and trichloroacetonitrile in the starting reaction mixture may vary widely. Advantageously, 100% to at least as low as 5% acetonitrile, ignoring added initiator, may be used in a starting reaction mixture having from zero to 95% trichloroacetonitrile.

If only acetonitrile and initiator are used as a starting material, the requisite concentration of trichloroacetonitrile is formed in situ by the initial chlorination of acetonitrile. In a system utilizing a starting mixture of acetonitrile, trichloroacetonitrile and initiator it is desirable to provide the starting reaction mixture with at least 18% by weight trichloroacetonitrile so that substantially all acetonitrile converted will form monochloroacetonitrile rather than the trichloro derivative.

In carrying out the invention, the temperature of the reaction medium is advantageously adjusted to a reaction temperature of 30-50° C., and preferably from 35-45° C. Preferably, the reaction temperature is so adjusted prior to commencing chlorination. Advantageously, however, the heat of chlorination may be utilized to raise the temperature to the reaction temperature if desired.

The reaction mixture is chlorinated by methods well known to those skilled in the art while maintaining said temperature. As HCl builds up in the reaction mixture, the mixture becomes saturated therewith and thereafter HCl is evolved from the reaction mixture as chlorination is continued. Chlorination is continued until the desired depth of chlorination is obtained. Reaction time is dependent upon temperature, upon the rate at which a source of chlorine is provided to the reaction mixture, and upon the desired depth of chlorination.

Chlorination is then discontinued and the reaction mixture is promptly neutralized with a base at a temperature below about 70° C. If temperature of the reaction mixture rises above this temperature prior to completing neutralization significant amounts of monochloroacetonitrile will be converted to trichloroacetonitrile resulting in lower yields of monochloroacetonitrile. While any base may be used which will not cause hydrolysis of the reaction products, it is desirable to neutralize the reaction mixture with an inorganic base preferably selected from the group consisting of alkaline and alkali metal carbonates, bicarbonates, and hydroxides.

It has been discovered that neutralization of the reaction mixture at a temperature of less than about 70° C. stabilizes the monochloroacetonitrile in the neutralized reaction mixture. Thereafter conversion of monochloroacetonitrile to trichloroacetonitrile will no longer take place, thus making it possible to separate the monochlorinated derivative from the reaction mixture at temperatures substantially above 70° C. if desired.

Monochloroacetonitrile may then be recovered by distillation or other known techniques from the unreacted acetonitrile, and trichloroacetonitrile in the neutralized reaction mixture.

The process of neutralizing HCl and other acids in the mixture may result in the formation of small amounts of water. To prevent possible hydrolysis of reaction products it is advantageous to dry the mixture with known drying agents such as magnesium sulfate, or calcium chloride to remove any water which may be formed during the neutralization step. Alternatively, water of neutralization may be scavenged from the reaction mixture during the neutralization step using a mixture of neutralizing base and drying agent.

EXAMPLE I

A 500 ml. of 4-neck round bottom flask was equipped with a blade stirrer, gas inlet medium fritted glass sparge tube, thermometer, and cold finger condenser. One of the necks was also fitted with a rubber septum for sampling. The sparge tube was connected to a T joint from which dry $N_2$ gas and chlorine were fed through a rotometer from a small $Cl_2$ cylinder placed on a scale Twenty-five to thirty grams anhydrous HCl was added with cooling to 175.0 grams of acetonitrile. This mixture was charged to the above-described reactor. The cold finger trap and following trap were cooled to approximately —20° C. with $CCl_4$/Dry Ice slush. Chlorination was commenced at 25° C., whereupon the temperature of the reaction mixture rose to 38-40° C.

The temperature was maintained in this range with the aid of a water bath. Chlorniation was continued for a period of 10 hours at a rate of approximately 1.0 gram chlorine per minute. Samples were taken periodically with a syringe, neutralized and analyzed. It was determined that if the samples were not neutralized there was rapid conversion of monochloroacetonitrile to trichloroacetonitrile and of trichloroacetonitrile to a polymeric material.

Upon completion of chlorination, a portion of the reaction mixture was neutralized with sodium bicarbonate, dried with magnesium sulfate and analyzed by vapor phase chromatography employing an internal standard with calculated response factors. The samples were found to contain 18.07 percent monochloroacetonitrile, which represents a 35% yield of monochloroacetonitrile based upon acetonitrile converted.

EXAMPLE II

The reactor of Example I was charged with 85.8 grams acetonitrile and 80.4 grams trichloroacetonitrile. Anhydrous HCl was bubbled in while maintaining the temperature at 5° C. A weight gain of 20.7 grams was obtained at the saturation point. Upon warming to the reaction temperature of 38° C., 65.7 percent of the originally solubilized HCl was vaporized, 7.1 grams of the originally solubilized HCl remaining in the reaction mixture at this temperature. A total of 76 grams chlorine was then added in 113 minutes. Temperature during chlorination was maintained at 38° C. The reaction mixture was neutralized with sodium bicarboante, dried with magnesium sulfate, and analyzed by vapor phase chromatography. The sample contained monochloroacetonitrile representing a yield of 40.9% based on acetonitrile converted.

We claim:
1. A process for producing monochloroacetonitrile by liquid phase chlorination of acetonitrile in the presence of a catalytic amount of an initiator selected from the group consisting of aluminum chloride, zinc chloride, boron trifluoride, hydrogen chloride, nitric acid, sulfuric acid and acetic acid comprising:
   (a) chlorinating acetonitrile at a temperature of 30–50° C. in a reaction mixture containing at least 18% by weight of trichloroacetonitrile,
   (b) neutralizing said reaction mixture at a temperature not exceeding 70° C., and
   (c) separating monochloracetonitrile from said reaction mixture.
2. The process of claim 1 wherein the said trichloroacetonitrile is formed in situ by the chlorination of acetonitrile.
3. The process of claim 1 wherein said acetonitrile is chlorinated at a temperature of 35–45° C.
4. The process of claim 1 wherein the reaction mixture is neutralized at a temperature not exceeding 50° C.
5. The process of claim 1 wherein the reaction mixture is neutralized with an inorganic base selected from the group consisting of alkaline and alkali metal carbonates, bicarbonates and hydroxides.
6. The process of claim 1 wherein water formed in neutralizing the reaction mixture is removed prior to separating monochloroacetonitrile therefrom.
7. The process of claim 1 wherein monochloroacetonitrile is separated from said reaction mixture by distillation.
8. The process of claim 1 wherein said initiator is anhydrous HCl.
9. A process for producing monochloroacetonitrile by liquid phase chlorination of acetonitrile in the presence of a catalytic amount of an initiator selected from the group consisting of aluminum chloride, zinc chloride, boron trifluoride, hydrogen chloride, nitric acid, sulfuric acid and acetic acid comprising:
   (a) chlorinating acetonitrile in a reaction mixture consisting of acetonitrile and initiator at a temperature of 30 to 50° C. to form a reaction mixture containing trichloroacetonitrile, continuing chlorination at said temperature until at least 30% of said acetonitrile has been reacted,
   (b) neutralizing said reaction mixture at a temperature not exceeding 70° C.,
   (c) separating monochloroacetonitrile from said reaction mixture.

References Cited

UNITED STATES PATENTS

| | | | |
|---|---|---|---|
| 2,283,237 | 5/1942 | Spence et al. | 260—465.7 |
| 2,331,681 | 10/1943 | Hechenbleikner | 260—465.7 |
| 2,331,682 | 10/1943 | Heckenbleikner | 260—465.7 |
| 2,442,542 | 6/1948 | Hechenbleikner | 260—465.7 |
| 3,121,735 | 2/1964 | Henry et al. | 260—465.7 |
| 2,375,545 | 5/1945 | Foster | 260—465.7 |
| 2,745,868 | 5/1956 | Kabisch | 260—465.7 |

FOREIGN PATENTS

| | | | |
|---|---|---|---|
| 522,835 | 6/1940 | Great Britain | 260—465.7 |

JOSEPH P. BRUST, Primary Examiner